(12) United States Patent
Nguyen et al.

(10) Patent No.: US 11,091,687 B2
(45) Date of Patent: Aug. 17, 2021

(54) METHODS OF IMPROVING CONFORMANCE APPLICATIONS

(71) Applicant: Halliburton Energy Services Inc., Houston, TX (US)

(72) Inventors: Philip D. Nguyen, Houston, TX (US); John Davis, Al Khobar (SA); Julio E. Vasquez, Kingwood, TX (US); Larry S. Eoff, Porter, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/636,216

(22) PCT Filed: Sep. 13, 2017

(86) PCT No.: PCT/US2017/051349
§ 371 (c)(1),
(2) Date: Feb. 3, 2020

(87) PCT Pub. No.: WO2019/055000
PCT Pub. Date: Mar. 21, 2019

(65) Prior Publication Data
US 2020/0369943 A1 Nov. 26, 2020

(51) Int. Cl.
*C09K 8/508* (2006.01)
*C09K 8/504* (2006.01)
(Continued)

(52) U.S. Cl.
CPC .......... *C09K 8/5083* (2013.01); *C09K 8/5045* (2013.01); *C09K 8/514* (2013.01);
(Continued)

(58) Field of Classification Search
CPC .......... C09K 8/805; C09K 8/516; C09K 8/68; C09K 8/035; C09K 2208/18; E21B 33/138; E21B 43/267; E21B 43/26; E21B 21/003
See application file for complete search history.

(56) References Cited

U.S. PATENT DOCUMENTS

| 6,889,766 B2 | 5/2005 | Creel et al. |
| 2007/0039732 A1 | 2/2007 | Dawson et al. |

(Continued)

FOREIGN PATENT DOCUMENTS

| WO | 2007104911 A1 | 9/2007 |
| WO | 2017027000 A1 | 2/2017 |

OTHER PUBLICATIONS

Abbasy, I. et al., "Laboratory Evaluation of Water Swellable Materials for Fracture Shutoff", Society of Petroleum Engineers, 2008 SPE Conference, SPE 111492, Mar. 2008.
(Continued)

*Primary Examiner* — Zakiya W Bates
(74) *Attorney, Agent, or Firm* — McAfee & Taft (57) ABSTRACT

A method of treating a reservoir penetrated by at least one well involves placing a consolidated solids pack into a permeable zone of rock in the reservoir. The consolidated solids pack has a reduced permeability to water and a reduced mobility in the permeable zone. For example, when placed in the permeable zone in connection with a water flooding operation, the consolidated solids pack diverts the injectant from the permeable zone to other less permeable zones of the reservoir that contain oil.

22 Claims, 6 Drawing Sheets

(51) Int. Cl.
    *C09K 8/514*          (2006.01)
    *C09K 8/516*          (2006.01)
    *C09K 8/588*          (2006.01)
    *E21B 43/22*          (2006.01)
    *E21B 33/128*        (2006.01)
    *E21B 33/138*        (2006.01)

(52) U.S. Cl.
    CPC .............. *C09K 8/516* (2013.01); *C09K 8/588* (2013.01); *E21B 33/138* (2013.01)

(56) References Cited

U.S. PATENT DOCUMENTS

| | | |
|---|---|---|
| 2007/0169937 A1 | 7/2007 | Allin et al. |
| 2008/0108524 A1* | 5/2008 | Willberg ................ C09K 8/035 507/225 |
| 2009/0078427 A1 | 3/2009 | Patel |
| 2010/0163246 A1 | 7/2010 | Balzcewski |
| 2011/0024115 A1 | 2/2011 | Brice et al. |
| 2012/0328377 A1 | 12/2012 | Brenneis et al. |
| 2013/0180708 A1 | 7/2013 | Ware et al. |
| 2013/0248191 A1 | 9/2013 | Nguyen |

OTHER PUBLICATIONS

International Search Report and Written Opinion issued in PCT Application No. PCT/US2017/051349, dated May 28, 2018.

* cited by examiner

METHODS OF IMPROVING CONFORMANCE APPLICATIONS

BACKGROUND

The production of oil and/or other hydrocarbons from a subterranean oil reservoir can entail multiple stages, including a primary production stage and a secondary production stage. In the primary production stage, also known as primary recovery, hydrocarbons are caused to flow into the wellbore and to the surface for recovery by natural forces in the reservoir and/or the use of an artificial lift system (such as a rod pump or a submersible pump). For example, the primary production stage lasts until the reservoir pressure becomes so low that hydrocarbons cannot be economically produced from the well. For example, the primary production stage may yield only about 5% to about 15% of oil in an oil reservoir.

In order to economically produce more hydrocarbons from the well, a secondary production stage, also known as secondary recovery, is often implemented. A commonly used secondary recovery operation is secondary flooding. In a secondary flooding operation, an injection fluid such as water or gas (the "injectant") is injected into the reservoir through one or more injection wells that are in fluid communication with one or more production wells in the reservoir. The injectant increases the pressure in the reservoir and drives hydrocarbons in the reservoir toward one or more of the production wells therein. For example, the secondary production stage typically lasts until the injectant is produced through the production well(s) in an amount such that production of hydrocarbons from the reservoir is no longer economical. For example, a secondary flooding technique can allow an additional 15% to 50% of the original oil in the reservoir to be recovered.

Even after a secondary recovery operation is carried out, significant hydrocarbons may still remain in the reservoir. As a result, in order to further increase the recovery of hydrocarbons from the reservoir, tertiary and even additional recovery operations are often carried out. In a tertiary flooding operation, for example, another injectant (for example, a fluid that is miscible or partially miscible with the oil in the reservoir) is injected into the reservoir through the injection well(s) in order to drive more oil from the reservoir to one or more production wells.

Hydrocarbon reservoirs often contain fractures, vugs, voids, fissures, karsted zones and/or other openings that form permeable flow paths (for example, paths of least resistance) or other permeable zones in the reservoir. For example, a permeable zone can be characterized by one or more cavities (typically small to medium-sized cavities) inside rock in the reservoir. For example, during secondary, tertiary or additional flooding operations (collectively referred to as "flooding operations"), the injectant often flows primarily through the permeable zone, bypassing less permeable zones and thus leaving a significant amount of hydrocarbons in the reservoir. In addition, the permeable zone can prevent the pressure drop across the reservoir that is needed to effectively displace hydrocarbons from the reservoir from being achieved. The amount of hydrocarbons displaced by the injectant is thus reduced, resulting in a reduction in the sweep efficiency of the injectant. As the injectant continues to flow through the more permeable zone, the rock structure within that zone erodes, thus exacerbating the problem. Moreover, the permeable zone may allow the injectant to prematurely communicate with the production well, resulting in the recovery of the injectant rather than the hydrocarbons. This can be a significant problem, particularly in today's regulatory environment.

In order to control the production of excessive injectant, operators often carry out conformance treatments that force the injectant to travel other pathways while maintaining the injection fluid-drive mechanism necessary to drive hydrocarbons from the reservoir. One conformance treatment that has been used successfully comprises introducing water-swellable polymer particulates through the injection well or the production well into the reservoir adjacent to or in the permeable zone. Water is then allowed to contact and interact with the water-swellable polymer particulates in a manner that causes the polymer particulates to swell and inhibit fluid flow through the permeable zone. For example, the swollen polymer particulates redirect injectant that would otherwise flow into the permeable zone to less permeable areas of the reservoir containing hydrocarbons and thereby improve the sweep efficiency of the injectant. By inhibiting fluid flow through the permeable zone, a desired pressure drop across the reservoir can be achieved and maintained for a significant time. As a result, hydrocarbon production can be increased despite the presence of permeable zones in the reservoir.

A problem that can be encountered in connection with the use of water-swellable polymer particulates to inhibit the flow of the injectant through a permeable zone in a flooding operation is the mobility of the polymer particulates. Even after the polymer particulates are allowed to interact with water and swell, they are still individual discrete particles that can move through the reservoir. For example, pressure cycling and/or crossflow issues in the reservoir can cause the discrete swollen polymer particulates to move away from the permeable zone during the flooding operation and/or during production, which obviously can be detrimental to the performance of the treatment. Also, when the treatment is performed in a production well, the treatment typically must be tailed-in with cement or a conformance gel system to provide consolidation in the near-wellbore region in order to keep the swollen polymer particulates in place, preventing them from flowing back to the surface during well production.

BRIEF DESCRIPTION OF THE DRAWINGS

The drawings included with this application illustrate certain aspects of the embodiments described herein. However, the drawings should not be viewed as exclusive embodiments. The subject matter disclosed herein is capable of considerable modifications, alterations, combinations, and equivalents in form and function, as will be evident to those skilled in the art with the benefit of this disclosure.

DETAILED DESCRIPTION

The present disclosure may be understood more readily by reference to this detailed description as well as to the examples included herein. For simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure.

In accordance with the present disclosure, a method of treating a reservoir penetrated by at least one well is provided. As used herein and in the appended claims, a "reservoir" means a subsurface pool of hydrocarbons contained in a porous rock formation. For example, the reservoir can be an oil reservoir. For example, the reservoir can be a gas reservoir. For example, the reservoir can be an oil and gas reservoir. Unless stated otherwise, a "well" means a wellbore extending from the surface into the ground and capable of fluidly communicating with a reservoir. For example, the well can be a production well, an injection well, or any combination thereof. A "production well" means a well that is used to produce hydrocarbons (e.g., oil and/or gas) from an oil reservoir. An "injection well" means a well that is used to inject one or more fluids and/or materials into a reservoir. A single well can be both a production well and an injection well.

The method disclosed herein comprises:
  introducing a solids pack composition through a well penetrating the reservoir into a permeable zone in the reservoir, the solids pack composition including:
    a carrier fluid;
    a plurality of water-swellable polymer particulates; and
    a plurality of non-degradable solid particulates coated with a hardenable resin;
  allowing the hardenable resin to harden; and
  allowing water to contact the water-swellable polymer particulates, thereby causing the water-swellable polymer particulates to swell.

For example, the method can further comprise recovering one or more hydrocarbons through a well penetrating the reservoir. For example, the method can further comprise recovering oil through a well penetrating the reservoir. For example, the method can further comprise recovering gas through a well penetrating the reservoir. For example, the method can further comprise recovering oil and gas through a well penetrating the reservoir.

In accordance with the method disclosed herein, a consolidated solids pack is placed into a permeable zone of rock in the reservoir. The consolidated solids pack placed into the permeable zone in accordance with the disclosed method has a reduced permeability to water and other fluids, and a reduced mobility in the permeable zone. For example, when it has hardened, the hardenable resin coating the non-degradable solid particulates provides consolidation strength to the whole pack structure by welding or bonding the contact points between grains of non-degradable solid particulates. The swelling of the water-swellable polymer particulates sufficiently reduces the porosity of the pack matrix to inhibit fluid flow through the consolidated solids pack and the permeable zone in which the consolidated solids pack has been placed. For example, the swollen polymer particulates can form a gel mass that causes the consolidated solids pack to substantially block fluid flow through the permeable zone, insuring that the injectant in a water flooding operation, for example, passes through areas of the reservoir containing hydrocarbons. Once the resin has hardened and the solids pack is fully consolidated, the consolidated solids pack remains in the permeable zone by withstanding fluid pressure exerted on it during a subsequent flooding operation (for example, due to pressure cycling and/or crossflow issues in the reservoir).

As used herein and in the appended claims, a "consolidated solids pack" means a collection of solid particulate materials consolidated together. A "permeable zone of rock in a reservoir" means a perforated interval, fracture, vug, void, fissure, highly porous matrix, karsted zone and/or other opening in rock in a reservoir that forms a permeable flow path (for example, a path of least resistance) or other permeable area in the rock. The term "highly porous matrix" means a portion of the matrix in the reservoir that has an overall porosity that is higher than the average porosity of the matrix in the reservoir. For example, a permeable zone can be characterized by one or more small to medium-sized cavities inside rock in the reservoir. For example, a permeable zone of rock in a reservoir is more permeable to water than the rock itself. For example, types of rock in oil reservoirs include sedimentary rock such as sandstone, limestone, shale, and carbonates.

As used herein and in the appended claims, a consolidated solids pack having a "reduced permeability to water" in a reservoir means a solids pack that has a permeability to water in the reservoir that is less than the permeability to water in the reservoir that the same solids pack without a plurality of water-swellable polymer particulates would have under identical conditions. A consolidated solids pack having a "reduced mobility" in the reservoir means a solids pack that has a lower mobility through the reservoir due to fluid pressure than the same solids pack without a plurality of non-degradable particulate materials coated with a hardenable resin would have under identical conditions.

For example, the permeability to water of the consolidated solids pack placed into the permeable zone can be in the range of from about 0.000001 darcys to about 100 darcys. For example, the permeability to water of the consolidated solids pack placed into the permeable zone can be in the range of from about 0.0001 darcys to about 0.1 darcys. For example, the permeability to water of the consolidated solids pack placed into the permeable zone can be in the range of from about 0.001 darcys to about 0.01 darcys. For example, the consolidated solids pack can maintain a reduced permeability to water during a subsequent flooding operation and during production of hydrocarbons from the reservoir. For example, once the hardenable resin hardens, the consolidated solids pack can remain in place in the permeable zone during a subsequent flooding operation and during production of hydrocarbons from the reservoir.

For example, the consolidated solids pack can prevent the injectant that is injected into the reservoir in a flooding operation from flowing through the permeable zone and from prematurely flowing to the wellbore.

The well through which the solids pack composition is introduced can be an injection well or a production well. For example, when the disclosed method is used to treat a production well or the consolidated solids pack is otherwise introduced into the reservoir through a production well, it will usually not be necessary to tail-in the treatment with cement in order to keep the water-swellable polymer particulates and other components of the consolidated solids pack from flowing back to surface. For example, the consolidation strength of the consolidated solids pack can be sufficient to keep the water-swellable polymer particulates and other components of the consolidated solids pack from flowing back to surface.

For example, the carrier fluid of the solids pack composition can be an aqueous fluid or a non-aqueous fluid. The aqueous fluid or non-aqueous fluid can include an aqueous-miscible fluid, a water-in-oil emulsion, or an oil-in-water emulsion.

Examples of suitable aqueous fluids include fresh water, salt water, brine (for example, saturated saltwater or produced water), a potassium chloride solution, a calcium chloride solution, or combinations thereof. For example, seawater, brackish water, produced water (for example, water produced from a subterranean formation), formation water, treated flowback water, and any combination thereof can be used. Generally, the fluid can be from any source, provided that it does not contain components that might adversely affect the stability and/or performance of the solids pack composition. For example, the aqueous fluid can comprise fresh water.

Examples of suitable non-aqueous fluids include hydrocarbons, synthetic fluids, or combinations thereof. For example, suitable non-aqueous fluids include alkanes, olefins, aromatic organic compounds, cyclic alkanes, paraffins, diesel fluids, mineral oils, desulfurized hydrogenated kerosene, and any combination thereof.

Suitable aqueous-miscible fluids for use in connection with the carrier fluid of the solids pack composition used in the disclosed method include alcohols such as methanol, ethanol, n-propanol, isopropanol, n-butanol, sec-butanol, isobutanol, and t-butanol; glycerins; glycols such as polyglycols, propylene glycol, and ethylene glycol; polyglycol amines; polyols; combinations of such compounds with salts such as sodium chloride, calcium chloride, calcium bromide, zinc bromide, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; and combinations thereof.

Suitable water-in-oil emulsions, also known as invert emulsions, for use in connection with the solids pack composition used in the disclosed method may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base carrier fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid.

For example, the water-swellable polymer particulates of the solids pack composition can be formed of a crystalline polymer. For example, the water-swellable polymer particulates of the solids pack composition can be formed of one or more polymers selected from the group of polyacrylamide, polyacrylate, hydrolyzed polyacrylonitrile, carboxylalkyl cellulose, carboxymethyl starch, salts of carboxymethyl cellulose, carboxyalkyl polysaccharide, and any combination thereof. For example, the above polymers can be crosslinked. For example, the water-swellable polymer particulate of the solids pack composition can be a crosslinked polyacrylamide. An example of a crosslinked polyacrylamide crystal suitable for use in forming the water-swellable polymer particulates of the solids pack composition is CrystalSeal® polymer, which is available from Halliburton Energy Services, Inc. in association its CrystalSeal® service.

For example, before the water-swellable polymer particulates swell with water, the water-swellable polymer particulates can have a particle size in the range of from about 300 mesh to about 3 mesh, U.S. Sieve Series. For example, before the water-swellable polymer particulates swell with water, the water-swellable polymer particulates can have a particle size in the range of from about 100 mesh to about 6 mesh, U.S. Sieve Series. For example, after the water-swellable polymer particulates swell with water, the water-swellable polymer particulates can have a particle size in the range of from about 20 mesh to about 10 mesh, U.S. Sieve Series.

For example, the water-swellable polymer particulates can be present in the solids pack composition in an amount in the range of from about 0.1 weight percent to about 10 weight percent based on the total weight of the solids pack composition. For example, the water-swellable polymer particulates can be present in the solids pack composition in an amount in the range of from about 1 weight percent to about 5 weight percent based on the total weight of the solids pack composition.

For example, the coated non-degradable solid particulates can have a particle size in the range of from about 400 mesh to about 4 mesh, U.S. Sieve Series. For example, the coated non-degradable solid particulates can have a particle size in the range of from about 100 mesh to about 30 mesh, U.S. Sieve Series.

Examples of non-degradable solid particulates that can be used in connection with the solids pack composition include the same types of non-degradable solid particulates that are used as proppant particulates to prop open formation fractures formed or extended in fracturing operations. For example, the non-degradable solid particulates for use in connection with the solids pack composition include all shapes of materials, including substantially spherical materials, low to high aspect ratio materials, fibrous materials, polygonal materials (such as cubic materials), and mixtures thereof. For example, the non-degradable solid particulates can be selected from the group of sand, including natural sand, glass materials, sintered bauxite, polytetrafluoroethylene materials, fly ash, silica flour, seed shell pieces, fruit pit pieces, composite particulates including wood composite particulates, nut shell pieces including walnut hulls (for example, ground walnut hulls), man-made non-degradable proppant particulates, and mixtures thereof. Examples of man-made proppant particulates include bauxite, ceramics, and polymeric composite particulates. Suitable composite particulates include a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. For example, the non-degradable solid particulates of the solids pack composition can be natural sand.

For example, the hardenable resin that coats the non-degradable solid particulates can be any type of hardenable resin that will facilitate consolidation of the non-degradable solid particulates in the permeable zone. For example, the hardenable resin can be a resin that cures or otherwise hardens on its own over time, or a resin that that cures or otherwise hardens only when contacted with a hardening agent (a two-component resin system). As used herein and in the appended claims, a hardenable resin means a resin that is capable of curing or otherwise hardening, either on its own or when contacted with a resin hardening agent. A resin hardening agent means a curing agent or other agent that causes a hardenable resin to cure or otherwise harden.

For example, the non-degradable solid particulates can be either pre-coated with the hardenable resin or coated with the hardenable resin on the fly as the non-degradable solid particulates are pumped into the wellbore. If a two component resin system is used, some of the non-degradable solid particulates can be coated (either pre-coated or coated on the fly) with the hardenable resin, and some of the non-degradable solid particulates can be coated (either pre-coated or coated on the fly) with the hardening agent. For example, the non-degradable solid particulates can be coated with the hardenable resin prior to mixing the non-degradable solid particulates with the water-swellable polymer particulates of the solids pack composition.

For example, the hardenable resin that coats the non-degradable solid particulates of the solids pack composition used in the disclosed method can be selected from the group consisting of epoxies, furans, phenolics, furfuryl aldehydes, furfuryl alcohols, and mixtures thereof. For example, the hardenable resin can be selected from the group consisting of epoxies, furans, phenolics, and mixtures thereof.

If a two component resin system is used, the hardenable resin that coats the non-degradable solid particulates of the solids pack composition used in the disclosed method can be selected from the group consisting of polyepoxide resin, polyester resin, novolak resin, urea-aldehyde resin, urethane resin, and mixtures thereof. Examples of hardening agents that can be used to cure or harden the above hardenable resins can be selected from the group consisting of aliphatic amines, aromatic amines, polyamines, cyclo-aliphatic amines, amides, polyamides, 4,4'-diaminodiphenyl sulfone, and mixtures thereof. For example, the hardening agent can be used in an amount sufficient to cause the hardenable resin to cure or harden. An example of a hardenable resin and corresponding hardening agent that can be used is EXPEDITE™225 two-component resin system, which is available from Halliburton Energy Services, Inc.

For example, the coated non-degradable solid particulates can be present in the solids pack composition in an amount in the range of from about 90 weight percent to about 99.9 weight percent based on the total weight of the solids pack composition. For example, the coated non-degradable solid particulates can be present in the solids pack composition in an amount in the range of from about 95 weight percent to about 99 weight percent based on the total weight of the solids pack composition.

The exact type and amount of hardenable resin to use in coating the non-degradable solid particulates may depend on, among other factors, the composition and/or temperature of the reservoir, the chemical composition of reservoir fluids, the flow rate of fluids present in the reservoir, the effective porosity and/or permeability of the permeable zone, the pore throat size and distribution associated with the permeable zone, and the like. Furthermore, the concentration of the hardenable resin that is used can be varied to optimize or achieve the desirable consolidation strength in the solids pack, thereby being able to withstand high injection or production flow rates. It is within the ability of one skilled in the art, with the benefit of this disclosure, to determine the type and amount of hardenable resin to use in coating the non-degradable solid particulates of the solids pack composition to achieve the desired results.

As used herein and in the appended claims, "coated with a hardenable resin" means partially coated or fully coated with the hardenable resin. Any portion of the non-degradable solid particulates as a whole may be coated with the hardenable resin. The term "coating" and the like does not imply any particular degree of coating on the non-degradable solid particulates. In particular, the terms "coat" or "coating" do not imply 100% coverage of the non-degradable solid particulates by the hardenable resin. For example, at least a majority of the non-degradable solid particulates can be at least partially coated with the hardenable resin which may be sufficient to allow the solids pack composition to consolidate in-situ within the permeable zone to form the consolidated solids pack.

Additional components can also be included in the solids pack composition used in the disclosed method. Examples of additional components that can be used include surfactants, friction reducing agents, clay control agents, buffers and other pH control agents, biocides, bactericides, scale inhibitors, and corrosion inhibitors. As will be understood by those skilled in the art with the benefit of this disclosure, the additional components and the amounts thereof that are utilized will vary depending on the particular application in which the well treatment fluid is used. For example, surfactants that can be included in the solids pack composition include surfactants useful to improve the compatibility of the solids pack composition with formation and other fluids that may be present in the well. An artisan of ordinary skill with the benefit of this disclosure will be able to identify the types of surfactants as well as the appropriate concentrations thereof to be used.

For example, the solids pack composition can be introduced into the permeable zone by pumping the solids pack composition into the permeable zone through one or more wells penetrating the reservoir using pumping equipment present on the well site(s), as known to those skilled in the art with the benefit of this disclosure. As used herein and in the appended claims, "pumping the solids pack composition into the permeable zone" means pumping the solids pack composition as a whole into the permeable zone, or separately pumping one or more of the components of the solids pack composition into the permeable zone. In other words, the components of the solids pack composition can be introduced together or separately into the permeable zone. If the components of the solids pack composition are separately introduced into the permeable zone, the carrier fluid of the solids pack composition that is mixed with the water-swellable polymer particulates, and the carrier fluid of the solids pack composition that is mixed with the coated non-degradable solid particulates, can be the same or different.

For example, the solids pack composition can be pumped into the permeable zone through one or more production wells and/or one or more injection wells. For example, the solids pack composition is pumped into the permeable zone under a sufficient hydraulic pressure, e.g., above a fracturing gradient, and for a sufficient time to place the solids pack composition into the permeable zone. The hydraulic pressure placed on the reservoir forces the solids pack composition into the permeable zone. For example, when the pressure is released, the solids pack composition remains in the permeable zone for a sufficient time for the resin to harden. For example, once the resin hardens, the resulting consolidated solids pack composition remains in the permeable zone throughout a subsequent flooding operation.

For example, the solids pack composition can be pumped into the permeable zone through a well penetrating the reservoir through one or more access conduits from the well into the reservoir. As used herein and in the appended claims, the term "access conduit" refers to a passageway that provides fluid communication between the wellbore and the reservoir. Examples of access conduits include sliding sleeves, open holes, hydra-jetted holes and perforations. Access conduits can be formed in non-cased (open) areas and cased areas of the wellbore. The access conduits can extend through the casing wall (if present), cement used to hold the casing in place (if present) and the wellbore wall.

For example, the solids pack composition can be introduced into the permeable zone by mixing the water-swellable polymer particulates and the coated non-degradable solid particulates with a carrier fluid to form a combined slurry, and introducing the combined slurry through a well penetrating the reservoir into the permeable zone. For example, in order to prevent the water-swellable polymer particulates from prematurely swelling (for example, from completely swelling before they are placed in the permeable zone), the carrier fluid can be a non-aqueous carrier fluid. As another example, in order to prevent the water-swellable polymer particulates from prematurely swelling (for example, from completely swelling before they are placed in the permeable zone), the water-swellable polymer particulates can be coated or encapsulated with a degradable coating. Examples of suitable degradable coatings include polyvinyl alcohol, an aliphatic polyester; a poly(lactide); a poly(glycolide); a poly(ε-caprolactone); a poly(hydroxybutyrate); a poly(anhydride); an aliphatic polycarbonate; a poly(orthoester), and mixtures thereof.

The components of the solids pack composition can be mixed together in any manner known to those skilled in the art with the benefit of this disclosure. For example, components can be mixed together using mixing equipment present on the well site. For example, components can be added to the well treatment fluid on the fly as the solids pack composition (or one or more components thereof) is pumped into the wellbore.

For example, the solids pack composition can be placed into the permeable zone by: mixing the water-swellable polymer particulates with a carrier fluid to form a first slurry; introducing the first slurry through a well penetrating the reservoir into the permeable zone; mixing the non-degradable solid particulates coated with a hardenable resin with a carrier fluid to form a second slurry; and introducing the second slurry through a well penetrating the reservoir into the permeable zone. For example, the first slurry and the second slurry can be introduced into the permeable zone separately or together through the same well penetrating the reservoir. For example, the first slurry and the second slurry can be introduced into the permeable zone separately on a sequential or intermittent basis.

Regardless of the sequence in which they are mixed together, the components of the solids pack composition can be mixed with a carrier fluid to form a slurry on the surface and then injected into the well, or can be mixed with a carrier fluid on the fly as they are injected into the well. For example, if the water-swellable polymer particulates and coated non-degradable solid particulates are combined with the same carrier fluid to form a combined slurry, the components are mixed together when the combined slurry is formed. For example, the components can be mixed together on the surface or via a downhole mixer. On the other hand, if the water-swellable polymer particulates and the coated non-degradable solid particulates are separately introduced into the permeable zone, they are mixed together in the permeable zone.

For example, the hardenable resin coating the non-degradable solid particulates can be allowed to harden by allowing a sufficient time for the hardenable resin to cure or otherwise harden and a consolidated solids pack to form before further treatment of the reservoir (for example, a flooding operation carried out on the reservoir) is initiated. For example, if the hardenable resin is a two-component resin system that includes a hardenable resin and a hardening agent, it can be allowed to harden by mixing the components together in a static mixer before the components are pumped into the permeable zone. As another example, as mentioned above, some of the non-degradable solid particulates can be coated with the hardenable resin and some of the non-degradable solid particulates can be coated with the hardening agent. The particulates coated with the hardenable resin and the particulates coated with the hardening agent can then be combined with a carrier fluid and pumped into the permeable zone together as a mixed slurry.

The hardenable resin functions to consolidate the coated non-degradable solid particulates and hold them together within the permeable zone. This reduces the mobility of the consolidated solids pack and the water-swellable polymer particulates in the permeable zone.

Water can be allowed to contact the water-swellable polymer particulates, thereby causing the water-swellable polymer particulates to swell, in accordance with the method disclosed herein in a variety of ways. For example, contact of the water-swellable polymer particulates with water can be delayed until the water-swellable polymer particulates are in the permeable zone.

For example, water can be allowed to contact the water-swellable polymer particulates by using an aqueous fluid as the carrier fluid mixed with one or both of the water-swellable polymer particulates and the coated non-degradable solid particulates. For example, the carrier fluid mixed with one or both of the water-swellable polymer particulates and the non-degradable solid particulates can be an aqueous fluid. The aqueous fluid can be allowed to contact the water-swellable polymer particulates by contacting at least one of the carrier fluids that is an aqueous fluid with the water-swellable polymer particulates. The amount of water needed to cause the water-swellable polymer particulates to swell will depend on the amount of the water-swellable polymer particulates, the type of water-swellable polymer used, the degree of swelling necessary to reduce the permeability of the consolidated solids pack and other factors known to those skilled in the art with the benefit of this disclosure.

Figure 1A:
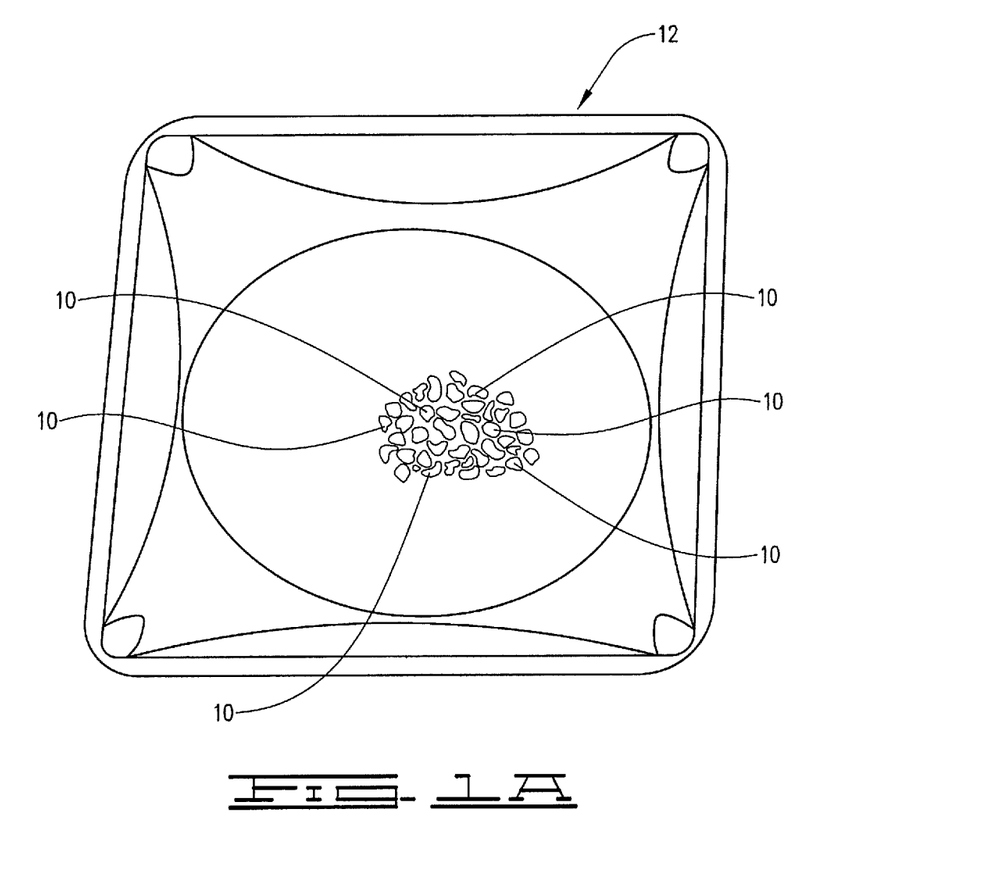
FIG. 1A is a schematic diagram illustrating a plurality of water-swellable polymer particulates formed of a crystalline polymer and held in a container, before the polymer particulates are allowed to interact with water and swell.
Figure 1B:
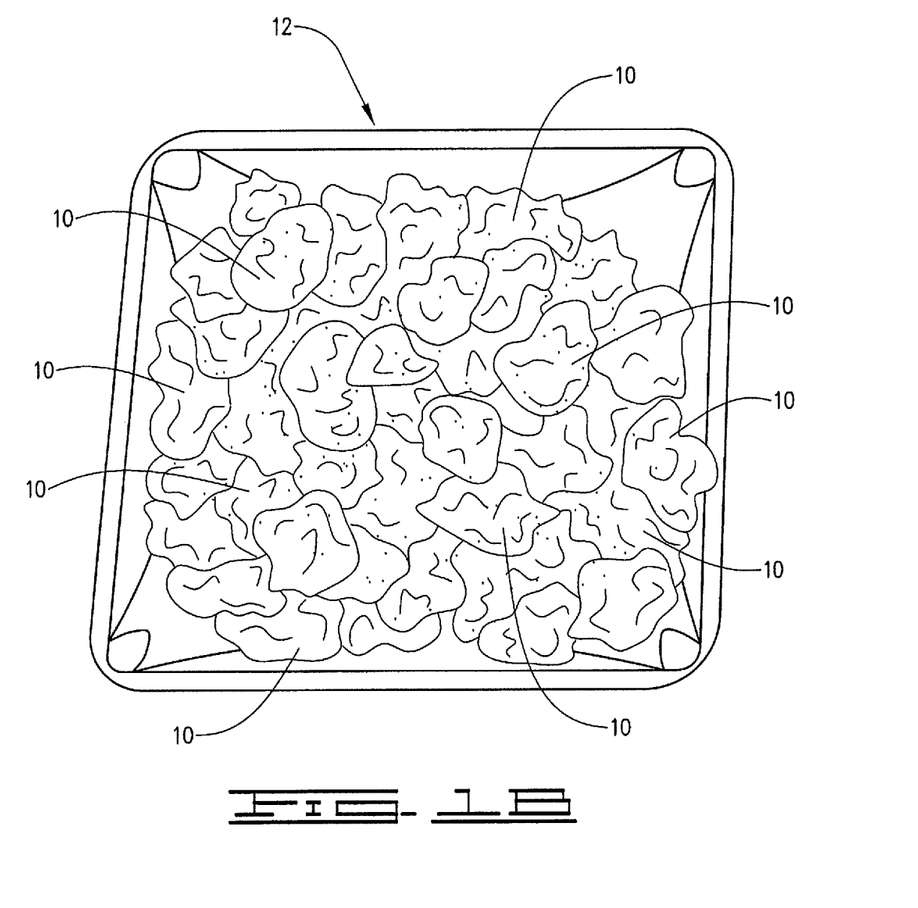
FIG. 1B is a schematic diagram illustrating the water-swellable polymer particulates and container shown by FIG. 1A after the polymer particulates are allowed to interact with water and swell.

FIGS. 1A and 1B illustrate the water-swellable polymer particulates of the solids pack composition used in the disclosed method, before and after the particulates are contacted with water. For example, as shown by FIG. 1A, before being contacted with water, the water-swellable polymer particulates 10 are relatively small, discrete particles that take up only a small portion of a container 12 in which they are placed. As shown by FIG. 1B, after being contacted with water, the water-swellable polymer particulates 10 swell and become larger whereby they take up most of the container 12.

For example, the carrier fluid mixed with the water-swellable polymer particulates can be a non-aqueous fluid, and the carrier fluid mixed with the coated non-degradable solid particulates can be an aqueous fluid. In this embodiment, in order to prevent the water-swellable polymer particulates from contacting water and swelling before they are placed in the permeable zone, the slurry of the water-swellable polymer particulates can be introduced into the permeable zone before the slurry containing the coated non-degradable solid particulates is placed in the permeable zone.

Alternatively, water can be allowed to contact the water-swellable polymer particulates in accordance with the method disclosed herein by separately introducing an aqueous fluid through a well penetrating the reservoir into the permeable zone in a manner that causes water to mix with the water-swellable polymer particulates in the permeable zone. For example, in one embodiment, the carrier fluid used to form each slurry can be a non-aqueous fluid, and an aqueous fluid can be separately introduced through a well penetrating the reservoir into the permeable zone in a manner that allows water to mix with the water-swellable polymer particulates.

For example, the size and nature of the consolidated solids pack can vary depending, in part, upon the amount of the solids pack composition used, the specific hardenable resin used and the size of the coated non-degradable solid particulates. For example, the solids pack composition is designed and used in an amount such that the consolidated solids pack sufficiently inhibits the flow of the injectant in a flooding operation through the permeable zone. For example, consolidated solids packs can be placed in multiple permeable zones in the reservoir in accordance with the method disclosed herein.

One or more hydrocarbons can be recovered from the reservoir through a well penetrating the reservoir in accordance with the method disclosed herein by any method known to those skilled in the art with the benefit of this disclosure. For example, hydrocarbons can be recovered from the reservoir after the consolidated solids pack is placed into the permeable zone.

In one embodiment, the method disclosed herein is used as a conformance application in connection with a flooding operation. For example, in this embodiment, the method further comprises the step of after placing the consolidated solids pack into the permeable zone, injecting an injectant into the reservoir through an injection well penetrating the reservoir to drive hydrocarbons (for example, oil) that are located in a portion of the reservoir outside of the permeable zone to a production well penetrating the reservoir. For example, the injectant can be injected into the reservoir through an injection well penetrating the reservoir to drive hydrocarbons (for example, oil) that are located in a portion of the reservoir outside of the permeable zone to a production well penetrating the reservoir before the step of recovering hydrocarbons through a production well penetrating the reservoir. For example, the injectant can be injected into the reservoir though one or more injection wells as known to those skilled in the art with the benefit of this disclosure.

For example, the injectant can be selected from the group of an aqueous fluid, carbon dioxide, nitrogen, methane, natural gas, and any combination thereof. For example, the injectant can be an aqueous fluid. For example, the injectant can be water.

For example, the reservoir can be penetrated by at least one injection well and at least one production well, and the solids pack composition can be introduced into the permeable zone of the reservoir by introducing the solids pack composition into the reservoir through an injection well, a production well, or both. For example, the reservoir can be penetrated by at least one injection well and at least one production well, and the solids pack composition can be introduced into the permeable zone of the reservoir by introducing the solids pack composition into the reservoir through an injection well. For example, the reservoir can be penetrated by at least one injection well and at least one production well, and the solids pack composition can be introduced into the permeable zone of the reservoir by introducing the solids pack composition into the reservoir through a production well. Regardless of whether the solids pack composition is placed into the permeable zone of the reservoir through an injection well, a production well or both, the injectant is injected into the reservoir through one or more injection wells to drive hydrocarbons (for example, oil) that are located in a portion of the reservoir outside of the permeable zone to one or more production wells penetrating the reservoir. The amount of hydrocarbon production can be monitored to determine if more of the solids pack composition needs to be added to the reservoir to block additional permeable zones and thus improve production.

For example, the carrier fluid of the solids pack composition, or the carrier fluid admixed with one or more of the components of the solids pack composition, can be the injectant. For example, the water-swellable polymer particulates can be introduced to an aqueous injectant stream as it is being pumped into an injection well such that the injectant stream also acts as the carrier fluid for the water-swellable polymer particulates. Because the injectant/carrier fluid is an aqueous solution, no additional step is required to contact the water-swellable polymer particulates with an aqueous solution to cause the water-swellable polymer particulates to swell.

For example, the carrier fluid of the solids pack composition can also be a non-aqueous solution such as a hydrocarbon, and the injectant can be an aqueous solution. As such, the water-swellable polymer particulates are combined with the non-aqueous carrier fluid before displacing the resulting composition through an injection well and into the permeable zone in the reservoir. The aqueous injectant is then displaced to the reservoir to cause the water-swellable polymer particulates to swell and to drive hydrocarbons from the reservoir to the production well(s).

For example, the method can further comprise removing the swollen polymer particulates from the consolidated solids pack or from the permeable zone. For example, swollen polymer particulates within the consolidated solids pack can be removed by circulating an oxidizer combined with an aqueous carrier fluid through the reservoir to flush the well or by other techniques known to those skilled in the art with the benefit of this disclosure. An example of an oxidizer that can be used is sodium hypochlorite.

Figure 2:
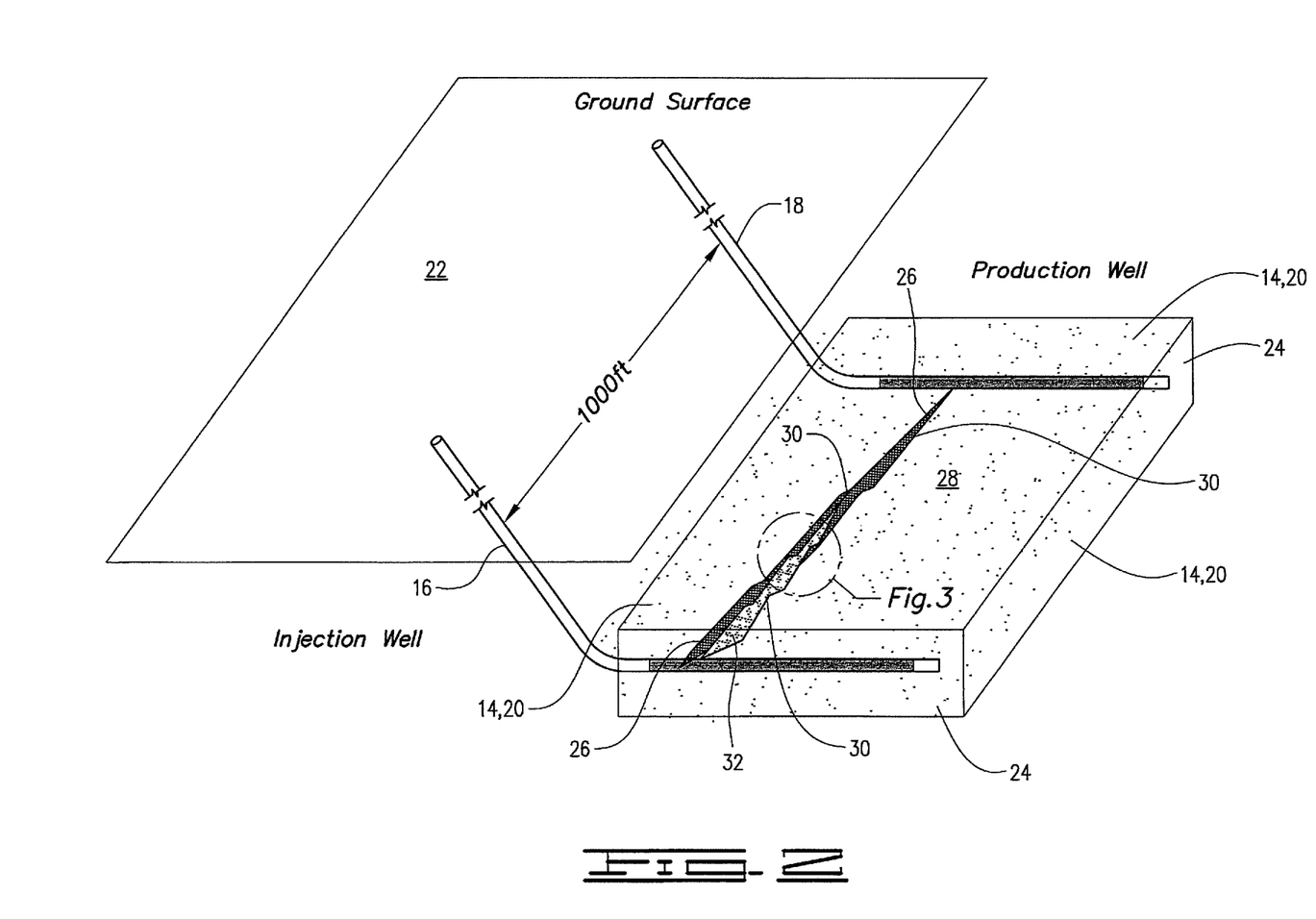
FIG. 2 is a schematic diagram illustrating a sandstone oil reservoir penetrated by an injection well and a production well, and having a fissure therein in which a consolidated solids pack has been formed in accordance with the method disclosed herein.

FIG. 2 illustrates use of the method as a conformance application in an oil reservoir 14 that is penetrated by an injection well 16 and a production well 18. The formation 20 in which the reservoir 14 exists consists primarily of sandstone. Each of the injection well 16 and the production well 18 extends from the surface 22 to the approximate depth of the reservoir 14 and then horizontally through a middle section 24 of the reservoir. The injection well 16 and production well 18 are separated by about 1000 feet, both on the surface 22 and in the reservoir 14.

As shown, a fissure 26 horizontally extends through the reservoir 14 from the injection well 16 to the production well 18. Prior to placement of a consolidated solids pack therein in accordance with the disclosed method, the fissure 26 constituted a permeable zone in the reservoir 14. Prior to placement of a consolidated solids pack in the fissure 26 in accordance with the disclosed method, the injectant in a flooding operation would tend to flow primarily through the fissure 26, bypassing less permeable zones 28 of the reservoir 14 and thus leaving a significant amount of hydrocarbons (for example, oil) in the reservoir. In addition, the fissure 26 would likely prevent a sufficient pressure drop across the reservoir 14 to effectively displace oil from the reservoir. The amount of oil displaced by the injectant would thus be reduced, resulting in a reduction in the sweep efficiency of the injectant. As the injectant continued to flow through the fissure 26, the rock 30 surrounding the fissure would erode, thus exacerbating the problem. Moreover, the fissure 26 would likely allow the injectant to prematurely communicate with the production well 18, resulting in the recovery of the injectant rather than hydrocarbons.

However, as shown, a consolidated solids pack 32 has been placed in the fissure 26 in accordance with the method disclosed herein. Due to swollen polymer particulates therein, the consolidated solids pack 32 reduces the water permeability of the fissure 26 which effectively prevents the injectant in a flooding operation from flowing through the fissure. For example, the swollen polymer particulates redirect the injectant that would otherwise flow into the fissure 26 to less permeable areas 28 of the reservoir 14 containing hydrocarbons and thereby improve the sweep efficiency of the injectant. By inhibiting fluid flow through the fissure 26, a desired pressure drop across the reservoir can be achieved and maintained for a significant time. As a result, hydrocarbon production can be increased despite the presence of the fissure 26 in the reservoir.

Furthermore, due to the consolidation achieved by the hardened resin, the consolidated solids pack 32 has reduced mobility and remains in place in the fissure 26. For example, without the consolidation achieved by the hardened resin, pressure cycling and/or crossflow issues in the reservoir 14 might cause the discrete swollen polymer particulates to move out of the fissure 26 during the flooding operation and/or during production. However, due to the fact that it is consolidated, the consolidated solids pack 32 and swollen polymer particulates therein remain in place in the fissure 26 during a subsequent flooding operation and during production. The treatment life of the swollen polymer particulates in the presence of pressure cycling, crossflow issues and the like is improved. The polymer particulates are held in place within the consolidated solids pack to withstand the pressure while at the same time providing the conformance function. Also, due to the fact that it is consolidated, the consolidated solids pack 32 can be placed into the fissure 26 through the production well 18 if desired. Even if the consolidated solids pack 32 is placed into the fissure 26 through the production well 18, there is no need to tail-in the treatment with cement or a conformance gel system to provide consolidation in the near-wellbore region in order to prevent the swollen polymer particulates from flowing back to surface during well production.

Figure 3:
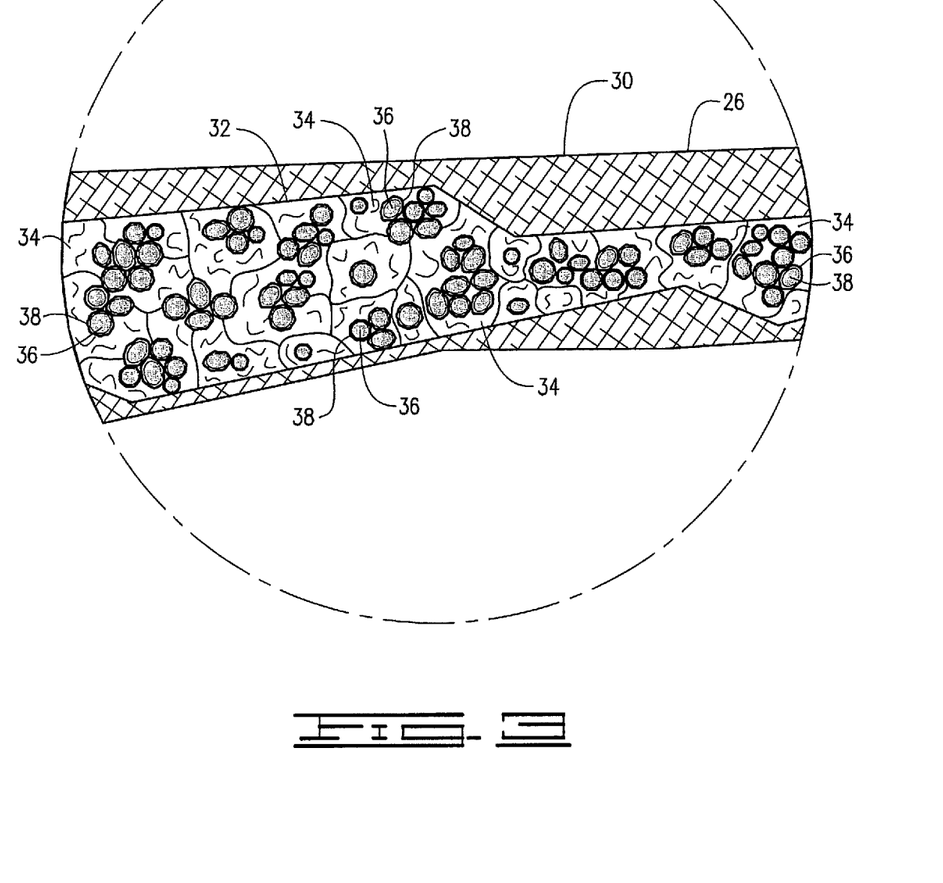
FIG. 3 is a detail view of a portion of the fissure and consolidated solids pack shown by FIG. 2.

FIG. 3 illustrates a portion of the consolidated solids pack 32 in the fissure 26 in detail. As shown, the consolidated solids pack 32 includes a plurality of water-swollen polymer particulates 34 interspersed with a plurality of non-degradable solid particulates 36 and consolidated with a hardened resin 38.

For example, in one embodiment, the method disclosed herein comprises:
introducing a solids pack composition through a well penetrating the reservoir into a permeable zone of the reservoir, the solids pack composition including:
a carrier fluid;
a plurality of water-swellable polymer particulates formed of a crystalline polymer, the water-swellable polymer particulates being present in the solids pack composition in an amount in the range of from about 0.1 weight percent to about 10 weight percent based on the total weight of the injectant flow inhibiting composition; and
a plurality of non-degradable solid particulates coated with a hardenable resin, the coated non-degradable solid particulates being present in the solids pack composition in an amount in the range of from about 90 weight percent to about 99.9 weight percent based on the total weight of the consolidated solids pack;
allowing the hardenable resin to harden; and
allowing water to contact the water-swellable polymer particulates, thereby causing the water-swellable polymer particulates to swell.

For example, in another embodiment, the reservoir is penetrated by at least one injection well and at least one production well, and the method disclosed herein comprises:
introducing a solids pack composition through an injection well penetrating the reservoir into a permeable zone of the reservoir, the solids pack composition including:
a carrier fluid;
a plurality of water-swellable polymer particulates, the water-swellable polymer particulates being present in the solids pack composition in an amount in the range of from about 0.1 weight percent to about 10 weight percent based on the total weight of the injectant flow inhibiting composition; and
a plurality of non-degradable solid particulates coated with a hardenable resin, the coated non-degradable solid particulates being present in the solids pack composition in an amount in the range of from about 90 weight percent to about 99.9 weight percent based on the total weight of the consolidated solids pack;
allowing the hardenable resin to harden;
allowing water to contact the water-swellable polymer particulates, thereby causing the water-swellable polymer particulates to swell; and
after allowing water to contact the water-swellable polymer particulates, thereby causing the water-swellable polymer particulates to swell, injecting an injectant into the reservoir through an injection well penetrating the reservoir to drive hydrocarbons that are located in a portion of the reservoir outside of the permeable zone to a production well penetrating the reservoir, wherein the injectant is an aqueous fluid;

For example, in another embodiment, the reservoir is penetrated by at least one injection well and at least one production well, and the method disclosed herein comprises:
introducing a solids pack composition through an injection well penetrating the reservoir into a permeable zone of the reservoir, the solids pack composition including:
a carrier fluid;
a plurality of water-swellable polymer particulates, the water-swellable polymer particulates being present in the solids pack composition in an amount in the range of from about 0.1 weight percent to about 10 weight percent based on the total weight of the injectant flow inhibiting composition; and a plurality of non-degradable solid particulates coated with a hardenable resin, the coated non-degradable solid particulates being present in the solids pack composition in an amount in the range of from about 90 weight percent to about 99.9 weight percent based on the total weight of the consolidated solids pack;

allowing the hardenable resin to harden;

allowing water to contact the water-swellable polymer particulates, thereby causing the water-swellable polymer particulates to swell; and after allowing water to contact the water-swellable polymer particulates, thereby causing the water-swellable polymer particulates to swell, injecting an injectant into the reservoir through a production well penetrating the reservoir to drive hydrocarbons that are located in a portion of the reservoir outside of the permeable zone to a production well penetrating the reservoir, wherein the injectant is an aqueous fluid.

For example, in another embodiment, the reservoir is penetrated by at least one injection well and at least one production well, and the method disclosed herein comprises:

introducing a solids pack composition through an injection well penetrating the reservoir into a permeable zone penetrating the reservoir, the solids pack composition including:

a carrier fluid;

a plurality of water-swellable polymer particulates, the water-swellable polymer particulates being present in the solids pack composition in an amount in the range of from about 0.1 weight percent to about 10 weight percent based on the total weight of the injectant flow inhibiting composition; and a plurality of non-degradable solid particulates coated with a hardenable resin, the coated non-degradable solid particulates being present in the solids pack composition in an amount in the range of from about 90 weight percent to about 99.9 weight percent based on the total weight of the consolidated solids pack;

allowing the hardenable resin to harden;

allowing water to contact the water-swellable polymer particulates, thereby causing the water-swellable polymer particulates to swell; and after allowing water to contact the water-swellable polymer particulates, thereby causing the water-swellable polymer particulates to swell, injecting an injectant into the reservoir through one or more injection wells penetrating the reservoir to drive hydrocarbons that are located in a portion of the reservoir outside of the permeable zone to one or more production wells penetrating the reservoir, wherein the injectant is an aqueous fluid.

Figure 4:
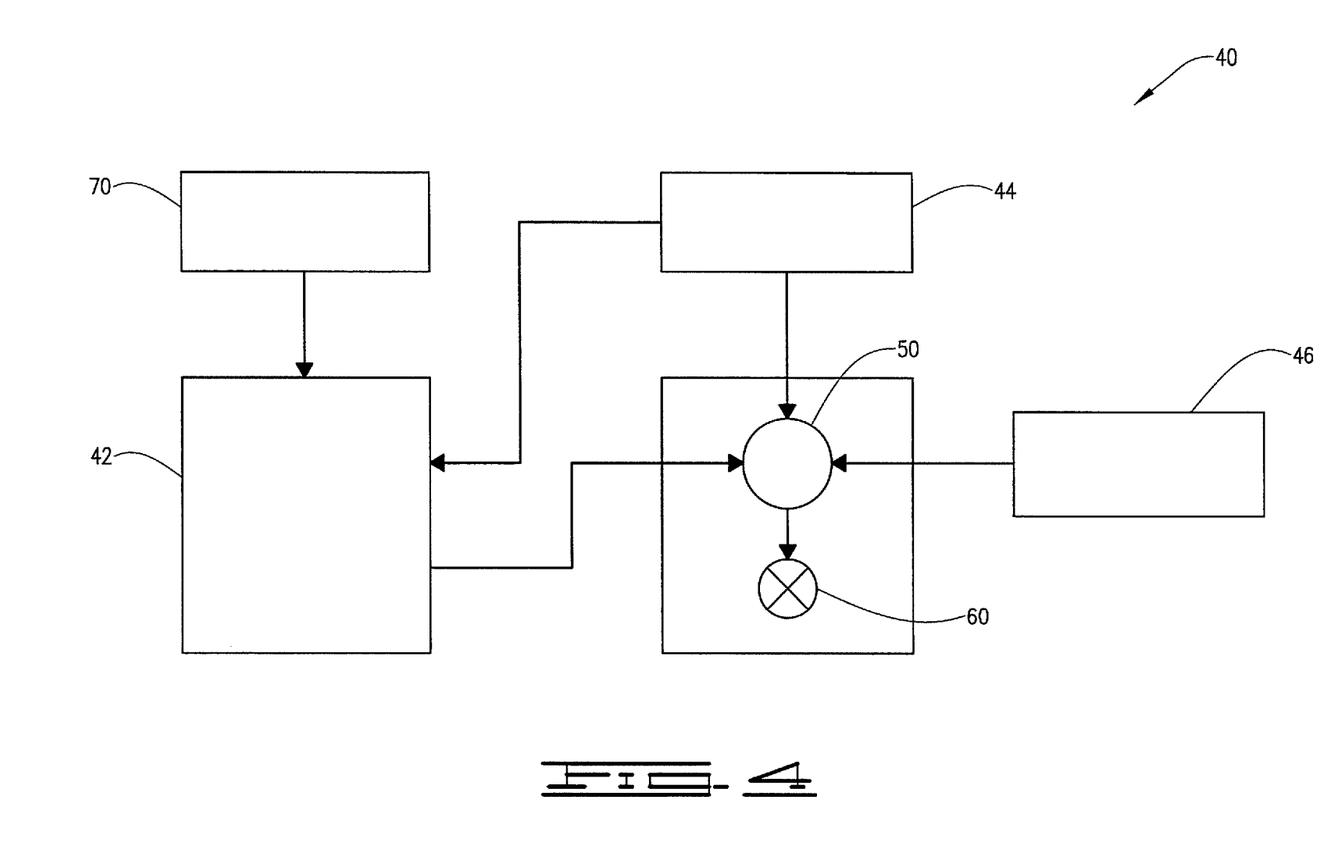
FIG. 4 is a diagram illustrating an example of a well that can be used in accordance with the method disclosed herein.
Figure 5:
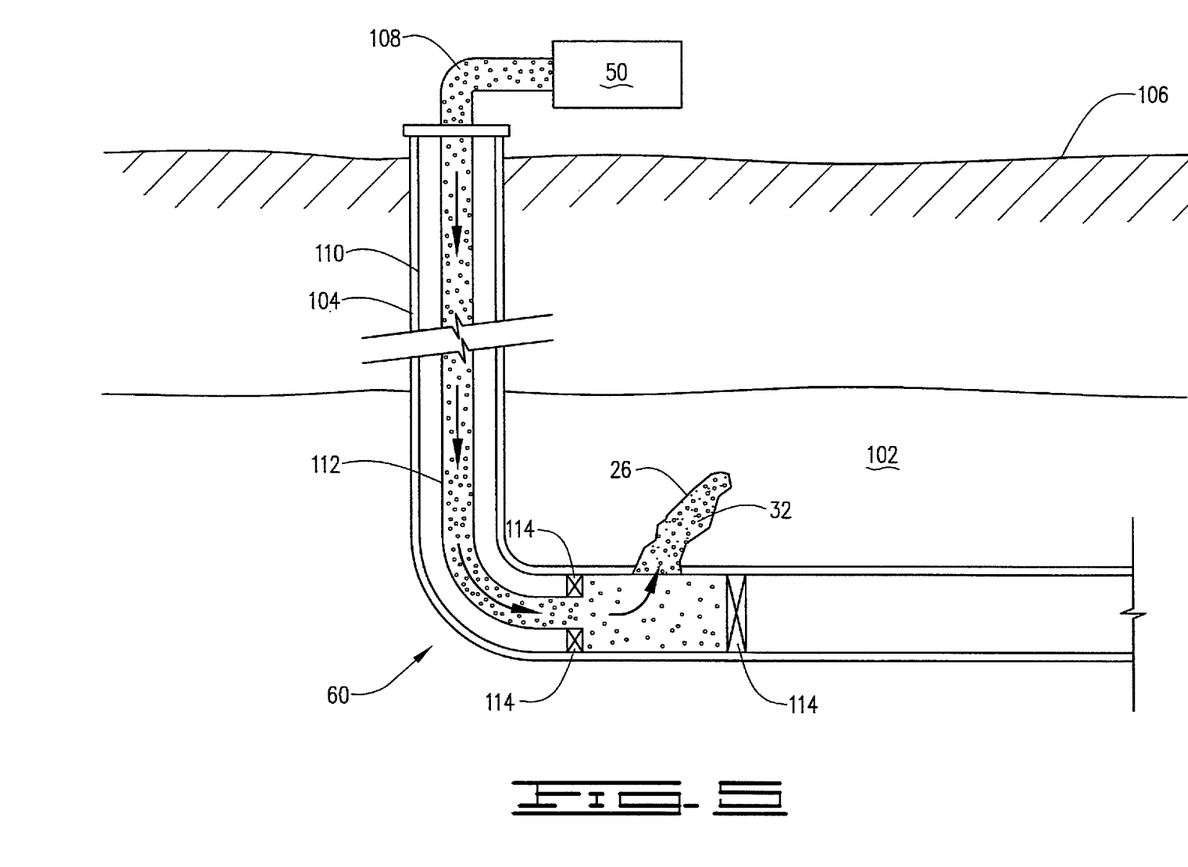
FIG. 5 is a diagram illustrating an example of a portion of a subterranean formation in which a conformance application can be performed in accordance with the method disclosed herein.

The exemplary fluids, compositions and methods disclosed herein may directly or indirectly affect one or more components or pieces of equipment associated with the preparation, delivery, recapture, recycling, reuse, and/or disposal of the disclosed fluids, compositions and methods. FIGS. 4 and 5 illustrate a typical injection well used in a flooding operation.

For example, and with reference to FIG. 4, the disclosed fluids, compositions and methods may directly or indirectly affect one or more components or pieces of equipment associated with an exemplary water flooding system 40, according to one or more embodiments. In certain instances, the system 40 includes treatment fluid producing apparatus 42, a fluid source 44, a solids source 46, and a pump and blender system 50. The system 40 resides at the surface at a well site where a well 60 is located. For example, the treatment fluid producing apparatus 42 can combine one or more components with a carrier fluid (e.g., liquid or substantially liquid) from fluid source 44, to produce a treatment fluid (for example, the solids pack composition) that can be injected into the well. The treatment fluid can be a fluid for ready use in a treatment of the well 60 or a concentrate to which additional fluid is added prior to use in treatment of the well 60. In other instances, the treatment fluid producing apparatus 42 can be omitted and the treatment fluid sourced directly from the fluid source 44. In certain instances, as discussed above, the treatment fluid may comprise water, a hydrocarbon fluid and/or other fluids.

The solids source 46 can include and provide solid particulates (for example, the non-degradable solids particulates used in the disclosed method) for combination with the treatment fluid as appropriate. The system may also include an additive source 70 that can provide one or more components (for example, the water-swellable polymer particulates) to the treatment fluid. For example, other additives from the additive source 70 can be included to reduce pumping friction, to reduce or eliminate the fluid's reaction to the geological formation in which the well is formed, to operate as surfactants, and/or to serve other functions.

For example, the pump and blender system 50 can receive the treatment fluid and combine it with other components, including solid particulates from the solids source 46 and/or additional fluid and other additives from the additive source 70. The resulting mixture may be pumped down the well 60 under a pressure sufficient to place the treatment fluid in a desired location in a formation or reservoir. Notably, in certain instances, the treatment fluid producing apparatus 42, fluid source 44, solids source 46 and/or additive source 70 may be equipped with one or more metering devices (not shown) to control the flow of fluids, particulates, and/or other compositions to the pump and blender system 50. Such metering devices may permit the pump and blender system 50 to source from one, some, or all of the different sources at a given time, and may facilitate the preparation of treatment fluids in accordance with the present disclosure using continuous mixing or "on the fly" methods. Thus, for example, the pump and blender system 50 can provide one slurry into the well at some times, another type of slurry at other times, and combinations of those components at yet other times.

FIG. 5 shows the injection well 60 during a flooding operation in a portion of a subterranean formation of interest 102 (for example, an oil reservoir) surrounding a wellbore 104. For example, the formation of interest can include one or more subterranean formations or a portion of a subterranean formation.

The wellbore 104 extends from the surface 106, and the treatment fluid 108 (for example, the solids pack composition) is applied to a portion of the subterranean formation 102 surrounding the horizontal portion of the wellbore (for example, a fissure in the rock in the reservoir). Although shown as vertical deviating to horizontal, the wellbore 104 may include horizontal, vertical, slanted, curved, and other types of wellbore geometries and orientations, and the treatment may be applied to a subterranean zone surrounding any portion of the wellbore. The wellbore 104 can include a casing 110 that is cemented or otherwise bonded to the wellbore wall. The wellbore 104 can be uncased or include uncased sections. Perforations can be formed in the casing 110 to allow treatment fluids and/or other materials to flow into the subterranean formation 102. In cased wells, perforations can be formed using shaped charges, a perforating gun, hydro jetting and/or other tools.

The well is shown with a work string 112 depending from the surface 106 into the wellbore 104. The pump and blender system 50 is coupled to a work string 112 to pump the treatment fluid (for example, the solids pack composition) 108 into the wellbore 104. The work string 112 may include coiled tubing, jointed pipe, and/or other structures that allow fluid to flow into the wellbore 104. The work string 112 can include flow control devices, bypass valves, ports, and/or other tools or well devices that control a flow of fluid from the interior of the work string 112 into the subterranean zone 102. For example, the work string 112 may include ports adjacent the wellbore wall to communicate the treatment fluid 108 directly into the subterranean formation 102, and/or the work string 112 may include ports that are spaced apart from the wellbore wall to communicate the treatment fluid 108 into an annulus in the wellbore between the work string 112 and the wellbore wall.

The work string 112 and/or the wellbore 104 may include one or more sets of packers 114 that seal the annulus between the work string 112 and wellbore 104 to define an interval of the wellbore 104 into which the treatment fluid 108 will be pumped. FIG. 5 shows two packers 114, one defining an uphole boundary of the interval and one defining the downhole end of the interval.

When the treatment fluid 108 is introduced into wellbore 104 (e.g., in FIG. 5, the area of the wellbore 104 between packers 114) at a sufficient hydraulic pressure, the treatment fluid is injected into the subterranean zone or reservoir 102.

While not specifically illustrated herein, the disclosed fluids, compositions and methods may also directly or indirectly affect any transport or delivery equipment used to convey the compositions to the treatment system 40 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

The following example illustrates specific embodiments consistent with the present disclosure but does not limit the scope of the disclosure or the appended claims. Concentrations and percentages are by weight unless otherwise indicated.

Example I

First, 200 grams of 20/40-Brady sand were dry coated by hand using a spatula with 2% volume by weight of a hardenable resin, specifically EXPEDITE™225 two-component epoxy resin system, available from Halliburton Energy Services, Inc. The resin coated sand was then added to 300 cc of 3% w/v KCl brine while stirring the fluid with an overhead stirrer. While stirring the sand slurry, one gram of water-swellable particulates that were formed of a crosslinked polyacrylamide crystal (CrystalSeal® polymer, available from Halliburton Energy Services, Inc.) was added to the slurry to form a homogeneous mixture. Stirring of the mixture was continued at low speed for 5 minutes.

Next, the water was decanted from the solids slurry leaving behind a clumpy agglomerate of sand and swelled gel balls. The agglomerate was packed into a flow cell (6-inch L×1.5-inch ID) before forming a tight seal to be shut in for curing at 200° F. for 3 days. After the curing period, the flow cell was allowed to cool down to room temperature. The sand pack was then transformed into a consolidated pack. Flow of water was established through the packed flow cell with an overhead reservoir. The permeability of the treated sand pack was determined by obtaining a stable flow rate and a water head. The permeability of the treated sand pack was 1.5 darcys.

Next, the same test was carried out, except instead of sand, a 20/40 mesh ceramic bauxite was used. Again the permeability of the treated bauxite pack was 1.5 darcys.

The typical permeabilities of 20/40-mesh Brady sand and 20/40-mesh bauxite proppant are in the range of 100 to 130 darcys. Accordingly, the results obtained in these tests indicate that the water-swellable particulates effectively decreased the permeability of the sand pack.

Therefore, the present compositions and methods are well adapted to attain the ends and advantages mentioned, as well as those that are inherent therein. The particular example disclosed above is illustrative only, as the present treatment additives and methods may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative example disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of treating a reservoir penetrated by at least one injection well and at least one production well, comprising:
introducing a solids pack composition through the injection well, the production well or both into a permeable zone of rock in the reservoir, wherein the solids pack composition is introduced into permeable zone at a pressure above the fracturing gradient, and wherein said solids pack composition includes:
a carrier fluid;
a plurality of water-swellable polymer particulates; and
a plurality of non-degradable solid particulates coated with a hardenable resin;
allowing said hardenable resin to harden;
allowing water to contact said water-swellable polymer particulates, thereby causing said water-swellable polymer particulates to swell thus inhibiting fluid flow through the permeable zone;
after the step of allowing water to contact said water-swellable polymer particulates, injecting an injectant into the reservoir through the injection well wherein the inhibiting fluid flow through the permeable zone redirects the injectant so as to drive hydrocarbons that are located in a portion of the reservoir outside of said permeable zone to the production well;

recovering the hydrocarbons from the reservoir through the production well;

monitoring recovery of hydrocarbons through the production well to determine if additional amounts of the solids pack composition need to be added to the reservoir to improve production; and adding such the additional amounts of the solids pack composition when the monitoring indicates it is needed.

2. The method of claim 1, wherein the reservoir is an oil reservoir.

3. The method of claim 1, further comprising removing the swollen polymer from the permeable zone.

4. The method of claim 1, wherein said carrier fluid is an aqueous fluid.

5. The method of claim 1, wherein said water-swellable polymer particulates are formed of one or more polymers selected from the group of polyacrylamide, polyacrylate, hydrolyzed polyacrylonitrile, carboxylalkyl cellulose, carboxymethyl starch, salts of carboxymethyl cellulose, carboxyalkyl polysaccharide, and any combination thereof.

6. The method of claim 1, wherein said water-swellable polymer particulates are present in said solids pack composition in an amount in the range of from about 0.1 weight percent to about 10 weight percent based on the total weight of said solids pack composition.

7. The method of claim 1, wherein said non-degradable solid particulates are selected from the group of sand, glass materials, sintered bauxite, polytetrafluoroethylene materials, fly ash, silica flour, seed shell pieces, fruit pit pieces, composite particulates, nut shell pieces, man-made non-degradable proppant particulates, and mixtures thereof.

8. The method of claim 1, wherein said hardenable resin is selected from the group of epoxies, furans, phenolics, furfuryl aldehydes, furfuryl alcohols, and mixtures thereof.

9. The method of claim 1, wherein said hardenable resin is allowed to harden by contacting it with a hardening agent.

10. The method of claim 1, wherein said coated non-degradable solid particulates are present in said solids pack composition in an amount in the range of from about 90 weight percent to about 99.9 weight percent based on the total weight of said solids pack composition.

11. The method of claim 1, wherein said solids pack composition is introduced into the permeable zone of rock in the reservoir by:

mixing said water-swellable polymer particulates with a carrier fluid to form a first slurry;

introducing said first slurry through a well penetrating the reservoir into the permeable zone;

mixing said non-degradable solid particulates coated with a hardenable resin with a carrier fluid to form a second slurry; and introducing said second slurry through a well penetrating the reservoir into the permeable zone.

12. The method of claim 11, wherein said carrier fluid that is mixed with one or both of said water-swellable polymer particulates and said non-degradable solid particulates is an aqueous fluid, and wherein water is allowed to contact said water-swellable polymer particulates by contacting at least one of said carrier fluids that is an aqueous fluid with said water-swellable polymer particulates.

13. The method of claim 1, wherein water is allowed to contact said water-swellable polymer particulates by separately introducing an aqueous fluid through a well penetrating the reservoir into said permeable zone in a manner that causes water to mix with said water-swellable polymer particulates in the permeable zone.

14. The method of claim 13, wherein said reservoir is penetrated by at least one injection well and at least one production well, and said solids pack composition is introduced into said permeable zone of the reservoir by introducing said solids pack composition into the reservoir through a production well.

15. A method of treating a reservoir penetrated by at least one well, comprising:

introducing a solids pack composition through a well penetrating the reservoir into a permeable zone of rock in the reservoir, said solids pack composition including:
a carrier fluid;
a plurality of water-swellable polymer particulates; and
a plurality of non-degradable solid particulates coated with a hardenable resin;

allowing said hardenable resin to harden;

allowing water to contact said water-swellable polymer particulates, thereby causing said water-swellable polymer particulates to swell thus inhibiting fluid flow through the permeable zone; and after allowing water to contact said water-swellable polymer particulates, thereby causing said water-swellable polymer particulates to swell, injecting an injectant into the reservoir through an injection well penetrating the reservoir wherein the inhibiting fluid flow through the permeable zone redirects the injectant so as to drive hydrocarbons that are located in a portion of the reservoir outside of said permeable zone to a production well penetrating said reservoir.

16. The method of claim 15, wherein said injectant injected into the reservoir is selected from the group of an aqueous fluid, carbon dioxide, nitrogen, methane, natural gas, and any combination thereof.

17. The method of claim 15, wherein said injectant is an aqueous fluid.

18. The method of claim 15, wherein said reservoir is penetrated by at least one injection well and at least one production well, and said solids pack composition is introduced into said permeable zone of the reservoir by introducing said solids pack composition into the reservoir through an injection well.

19. A method of treating a reservoir penetrated by at least one production well and at least one injection well, comprising:

introducing a solids pack composition through a well penetrating the reservoir into a permeable zone in the reservoir, said solids pack composition including:
a carrier fluid; a plurality of water-swellable polymer particulates, said water swellable polymer particulate being formed of a crystalline polymer; and
a plurality of non-degradable solid particulates coated with a hardenable resin;

allowing said hardenable resin to cure;

allowing water to contact said water-swellable polymer particulates, thereby causing said water-swellable polymer particulates to swell thus inhibiting fluid flow through the permeable zone; and after allowing water to contact said water-swellable polymer particulates, thereby causing said water-swellable polymer particulates to swell, injecting an injectant into the reservoir through one or more injection wells penetrating the reservoir wherein the inhibiting fluid flow through the permeable zone redirects the injectant so as to drive hydrocarbons that are located in a portion of the reservoir outside of said permeable zone to one or more production wells penetrating the reservoir, said injectant being selected from the group of an aqueous fluid, carbon dioxide, nitrogen, methane, natural gas, and any combination thereof.

20. The method of claim 19 wherein said solids pack composition is introduced through a well penetrating the reservoir into said permeable zone by pumping said solids pack composition through said well into said permeable zone using pumping equipment associated with said well.

21. The method of claim 19, wherein said reservoir is an oil reservoir.

22. The method of claim 21, further comprising recovering oil from the reservoir.

\* \* \* \* \*